United States Patent
Lainema

(10) Patent No.: US 12,200,241 B2
(45) Date of Patent: Jan. 14, 2025

(54) DC DOWN-SCALED WEIGHTED COST FUNCTION FOR IMAGE/VIDEO CODING

(71) Applicant: NOKIA TECHNOLOGIES OY, Espoo (FI)

(72) Inventor: Jani Lainema, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 50 days.

(21) Appl. No.: 17/995,029

(22) PCT Filed: Mar. 18, 2021

(86) PCT No.: PCT/EP2021/056943
§ 371 (c)(1),
(2) Date: Sep. 29, 2022

(87) PCT Pub. No.: WO2021/197860
PCT Pub. Date: Oct. 7, 2021

(65) Prior Publication Data
US 2023/0128882 A1  Apr. 27, 2023

Related U.S. Application Data

(60) Provisional application No. 63/002,328, filed on Mar. 30, 2020.

(51) Int. Cl.
*G06T 5/00* (2024.01)
*H04N 19/105* (2014.01)
(Continued)

(52) U.S. Cl.
CPC ......... *H04N 19/463* (2014.11); *H04N 19/105* (2014.11); *H04N 19/12* (2014.11);
(Continued)

(58) Field of Classification Search
CPC .... H04N 19/463; H04N 19/105; H04N 19/12; H04N 19/132; H04N 19/176;
(Continued)

(56) References Cited

U.S. PATENT DOCUMENTS

| | | | | |
|---|---|---|---|---|
| 5,012,517 A | * | 4/1991 | Wilson | ............ G10L 25/90 704/203 |
| 2003/0142764 A1 | * | 7/2003 | Keevill | ............ H04L 27/2678 714/795 |

(Continued)

OTHER PUBLICATIONS

Bjontegaard, G., "H.26L test Model Long Term No. 1 (TML-1) draft 1", ITU-Telecommunications Standardization Sector Study Group 16, Video Coding Experts Group (Question 15), Document Q15-H-36d1, (Aug. 3-6, 1999), 19 pages.

(Continued)

*Primary Examiner* — Howard D Brown, Jr.
(74) *Attorney, Agent, or Firm* — ALSTON & BIRD LLP

(57) ABSTRACT

A method, apparatus, and computer program product provide for improving parameter selection decisions in hybrid video and image codecs. In the context of a method, the method generates a block of difference samples based on a difference between a first block of samples and a second block of samples. The method also generates a block of transform coefficients by applying a transformation process to the block of difference samples. The method also determines an absolute value for each transform coefficient in the block of transform coefficients and determines a weighted (Continued)

sum value for all absolute values of the transform coefficients within the block of transform coefficients. The method also applies the weighted sum value as a criterion for a selection decision.

20 Claims, 5 Drawing Sheets

(51) Int. Cl.
    *H04N 19/12*     (2014.01)
    *H04N 19/132*     (2014.01)
    *H04N 19/176*     (2014.01)
    *H04N 19/18*     (2014.01)
    *H04N 19/463*     (2014.01)
    *H04N 19/61*     (2014.01)

(52) U.S. Cl.
    CPC ......... *H04N 19/132* (2014.11); *H04N 19/176* (2014.11); *H04N 19/18* (2014.11); *H04N 19/61* (2014.11)

(58) Field of Classification Search
    CPC ...... H04N 19/18; H04N 19/61; H04N 19/147; H04N 19/547
    See application file for complete search history.

(56) References Cited

U.S. PATENT DOCUMENTS

| | | | |
|---|---|---|---|
| 2013/0182971 A1* | 7/2013 | Leontaris | G06T 7/0002 |
| | | | 382/275 |
| 2018/0077414 A1* | 3/2018 | Reddy | H04N 19/176 |
| 2019/0045188 A1* | 2/2019 | Mahdi | H04N 19/14 |

OTHER PUBLICATIONS

Chen et al., "Algorithm Description for Versatile Video Coding and Test Model 8 (VTM 8)", Joint Video Experts Team (JVET) of ITU-T SG 16 WP 3 and ISO/IEC JTC 1/SC 29/WG 11, Document JVET-Q2002-v1, (Jan. 7-17, 2020), 92 pages.

"Reference software for ITU-T H.265 high efficiency video coding", International Telecommunication Union, ITU-T Telecommunication Standardization Sector of ITU, (Dec. 2016), 12 pages.

International Search Report and Written Opinion for Patent Cooperation Treaty Application No. PCT/EP2021/056943 dated Jun. 9, 2021, 18 pages.

Tu et al., "An Efficient Criterion for Mode Decision in H.264/AVC", 2006 IEEE International Conference on Multimedia and Expo, (Jul. 9-12, 2006), 4 pages.

Karczewicz et al., "Intra Frame Rate Control Based on SATD", Joint Collaborative Team on Video Coding (JCT-VC) of ITU-T SG 16 WP 3 and ISO/IEC JTC 1/SC 29/WG 11, 13th Meeting, (Apr. 18-26, 2013), 5 pages.

Lainema et al., "AHG10: Mean-Scaled SATD for VTM Encoder", Joint Video Experts Team (JVET) of ITU-T SG 16 WP 3 and ISO/IEC JTC 1/SC 29/WG 11, 18th Meeting, (Apr. 15-24, 2020), 4 pages.

"Video Coding for Low Bit Rate Communication", International Telecommunication Union, ITU-T H.263, (Jan. 2005), 226 pages.

"Advanced Video Coding for Generic Audiovisual Services", International Telecommunication Union, ITU-T H.264, (Aug. 2021), 844 pages.

"High Efficiency Video Coding", International Telecommunication Union, ITU-T H.265, (Aug. 2021), 716 pages.

* cited by examiner

DC DOWN-SCALED WEIGHTED COST FUNCTION FOR IMAGE/VIDEO CODING

CROSS-REFERENCE TO RELATED APPLICATIONS

This application is a national phase entry of International Application No. PCT/EP2021/056943, filed Mar. 18, 2021, which claims benefit of U.S. Provisional Application No. 63/002,328, filed Mar. 30, 2020, the contents of both of which are hereby incorporated by reference in their entirety.

TECHNOLOGICAL FIELD

An example embodiment relates generally to techniques in image and video coding, and, more particularly, to techniques for improving parameter selection decisions in hybrid video and image codecs.

BACKGROUND

Image and video encoders must evaluate a massive number of different modes, options and/or variables in order to determine set of parameters providing a desired representation of coded material at a target bitrate and/or a target quality level. In order to make optimal mode and parameter decisions in a rate-distortion sense, a video or image encoder needs to minimize a cost function that includes a measure of reconstruction error and the number of bits needed to code a block of samples with a candidate set of parameters. However, to be able to extract such information, an encoder has to perform a full sample encoding and decoding process, as well as arithmetic encoding of the parameters. In practice, this presents a significant computational burden and additionally, different encoders perform different approximations of the reconstruction error and bitrate in different encoding stages. The most complex encoders may still perform actual rate-distortion optimizations, but even those typically perform such operations only in final stages of encoding.

In particular, approximating reconstruction error during motion estimation is computationally challenging, as the space of potential motion vectors or motion parameters is typically large, and to reach a satisfactory motion compensation result, a significant number of motion vector candidates need to be analyzed. Similarly, selecting intra prediction modes or pre-selecting those for final analysis stages is challenging due to a large amount of intra prediction mode candidates in modern codecs. Making sub-optimal decisions with simplified cost functions has a negative impact on coding efficiency, however due to the computational limitations of practical encoders, these compromises are frequently made.

BRIEF SUMMARY

In an embodiment, an apparatus is provided comprising at least one processor and at least one memory including computer program code, the at least one memory and the computer program code configured to, with the at least one processor, cause the apparatus at least to generate a block of difference samples based on a difference between a first block of samples and a second block of samples. The at least one memory and the computer program code are further configured to, with the at least one processor, cause the apparatus to generate a block of transform coefficients by applying a transformation process to the block of difference samples. The at least one memory and the computer program code are further configured to, with the at least one processor, cause the apparatus to determine a representation for one or more transform coefficients in the block of transform coefficients. The at least one memory and the computer program code are further configured to, with the at least one processor, cause the apparatus to determine a weighted sum value for the representations of the transform coefficients within the block of transform coefficients, a weight of a transform coefficient being based at least on the position of the transform coefficient within the block of transform coefficients. The at least one memory and the computer program code are further configured to, with the at least one processor, cause the apparatus to apply the weighted sum value as a criterion for a selection decision.

In some embodiments of the apparatus, the transformation process comprises a Hadamard transform process. In some embodiments of the apparatus, the block of transform coefficients comprises a direct current (DC) coefficient, wherein the representation of the DC coefficient is scaled down with respect to the representations of other transform coefficients in the block of transform coefficients. In some embodiments of the apparatus, the weight of a respective transform coefficient is further based on one or more parameters. In some embodiments of the apparatus, the one or more parameters comprise one or more of a quantization parameter, a lambda parameter, a coding mode, a block size, a target bitrate, or one or more sample values. In some embodiments of the apparatus, the first block comprises a reference sample block and the second block comprises a predicted sample block. In some embodiments of the apparatus, the representation comprises an absolute value.

In another embodiment, an apparatus is provided comprising means for generating a block of difference samples based on a difference between a first block of samples and a second block of samples. The apparatus further comprises means for generating a block of transform coefficients by applying a transformation process to the block of difference samples. The apparatus further comprises means for determining a representation for one or more transform coefficients in the block of transform coefficients. The apparatus further comprises means for determining a weighted sum value for the representations of the transform coefficients within the block of transform coefficients, a weight of a transform coefficient being based at least on the position of the transform coefficient within the block of transform coefficients. The apparatus further comprises means for applying the weighted sum value as a criterion for a selection decision.

In some embodiments of the apparatus, the transformation process comprises a Hadamard transform process. In some embodiments of the apparatus, the block of transform coefficients comprises a direct current (DC) coefficient, wherein the representation of the DC coefficient is scaled down with respect to the representations of other transform coefficients in the block of transform coefficients. In some embodiments of the apparatus, the weight of a respective transform coefficient is further based on one or more parameters. In some embodiments of the apparatus, the one or more parameters comprise one or more of a quantization parameter, a lambda parameter, a coding mode, a block size, a target bitrate, or one or more sample values. In some embodiments of the apparatus, the first block comprises a reference sample block and the second block comprises a predicted sample block. In some embodiments of the apparatus, the representation comprises an absolute value.

In another embodiment, a computer program product is provided comprising a non-transitory computer readable storage medium having program code portions stored thereon, the program code portions configured, upon execution, to generate a block of difference samples based on a difference between a first block of samples and a second block of samples. The program code portions are further configured, upon execution, to generate a block of transform coefficients by applying a transformation process to the block of difference samples. The program code portions are further configured, upon execution, to determine a representation for one or more transform coefficients in the block of transform coefficients. The program code portions are further configured, upon execution, to determine a weighted sum value for the representations of the transform coefficients within the block of transform coefficients, a weight of a transform coefficient being based at least on the position of the transform coefficient within the block of transform coefficients. The program code portions are further configured, upon execution, to apply the weighted sum value as a criterion for a selection decision.

In some embodiments of the computer program product, the transformation process comprises a Hadamard transform process. In some embodiments of the computer program product, the block of transform coefficients comprises a direct current (DC) coefficient, wherein the representation of the DC coefficient is scaled down with respect to the representations of other transform coefficients in the block of transform coefficients. In some embodiments of the computer program product, the weight of a respective transform coefficient is further based on one or more parameters. In some embodiments of the computer program product, the one or more parameters comprise one or more of a quantization parameter, a lambda parameter, a coding mode, a block size, a target bitrate, or one or more sample values. In some embodiments of the computer program product, the first block comprises a reference sample block and the second block comprises a predicted sample block. In some embodiments of the computer program product, the representation comprises an absolute value.

In another embodiment, a method is provided, the method comprising generating a block of difference samples based on a difference between a first block of samples and a second block of samples. The method further comprises generating a block of transform coefficients by applying a transformation process to the block of difference samples. The method further comprises determining a representation for one or more transform coefficients in the block of transform coefficients. The method further comprises determining a weighted sum value for the representations of the transform coefficients within the block of transform coefficients, a weight of a transform coefficient being based at least on the position of the transform coefficient within the block of transform coefficients. The method further comprises applying the weighted sum value as a criterion for a selection decision.

In some embodiments of the method, the transformation process comprises a Hadamard transform process. In some embodiments of the method, the block of transform coefficients comprises a direct current (DC) coefficient, wherein the representation of the DC coefficient is scaled down with respect to the representations of other transform coefficients in the block of transform coefficients. In some embodiments of the method, the weight of a respective transform coefficient is further based on one or more parameters. In some embodiments of the method, the one or more parameters comprise one or more of a quantization parameter, a lambda parameter, a coding mode, a block size, a target bitrate, or one or more sample values. In some embodiments of the method, the first block comprises a reference sample block and the second block comprises a predicted sample block. In some embodiments of the method, the representation comprises an absolute value.

BRIEF DESCRIPTION OF THE DRAWINGS

Figure 1:
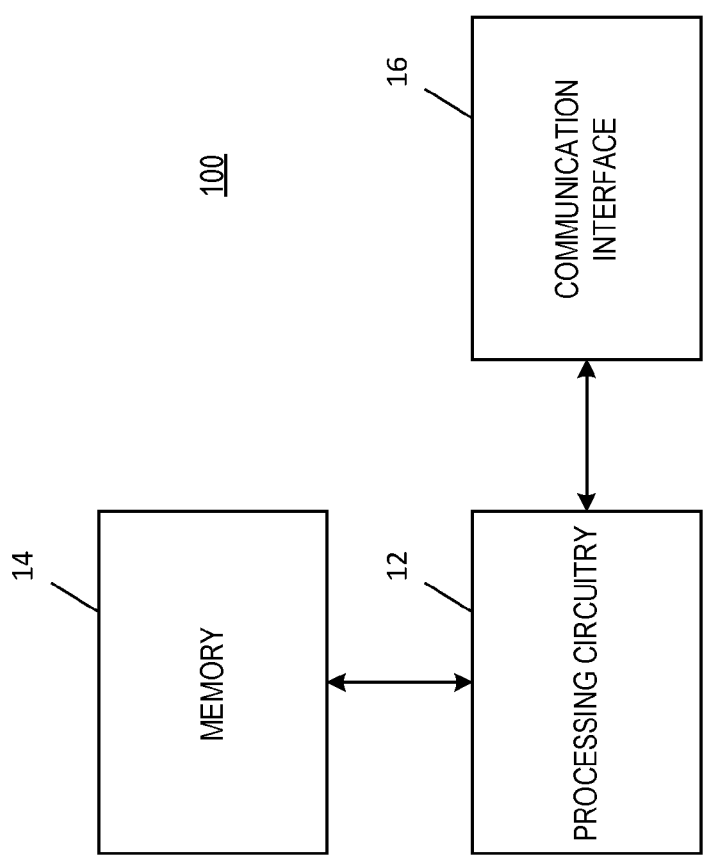
Figure 2A:
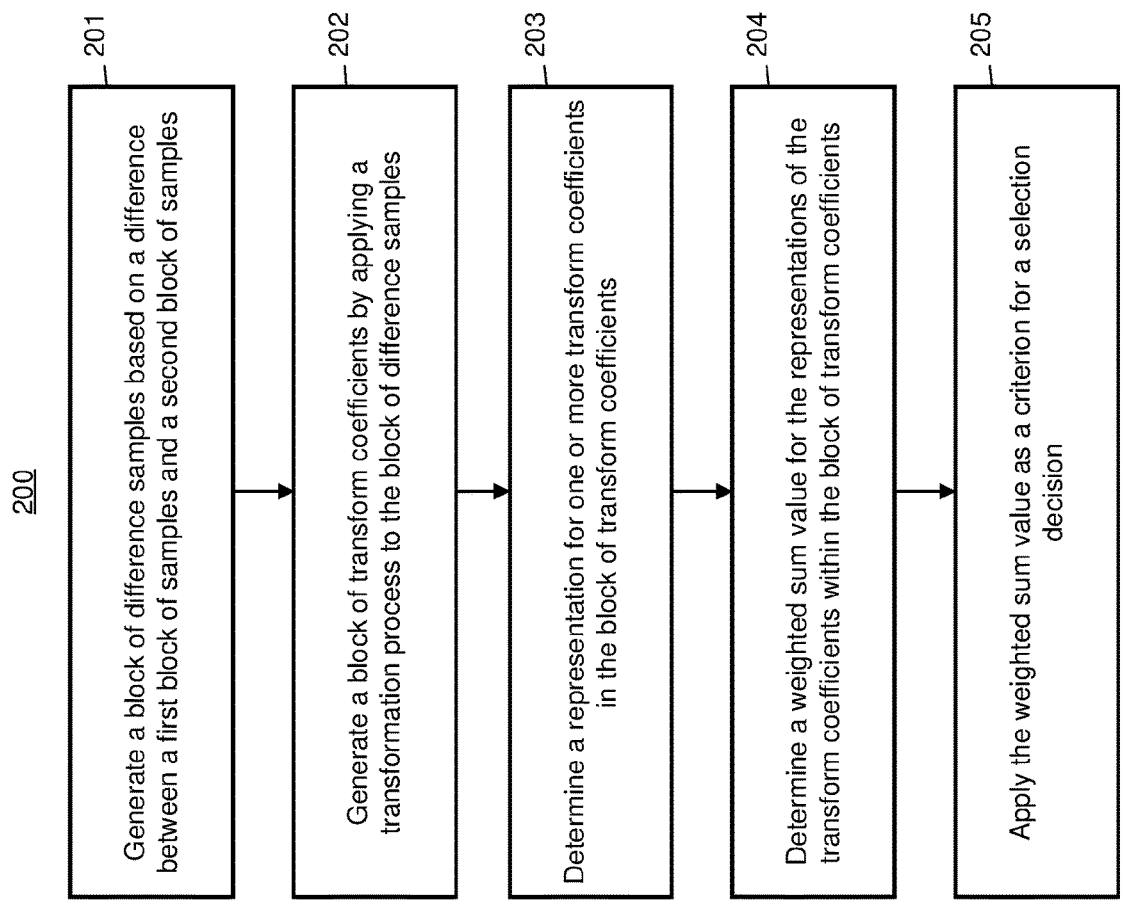
Figure 2B:
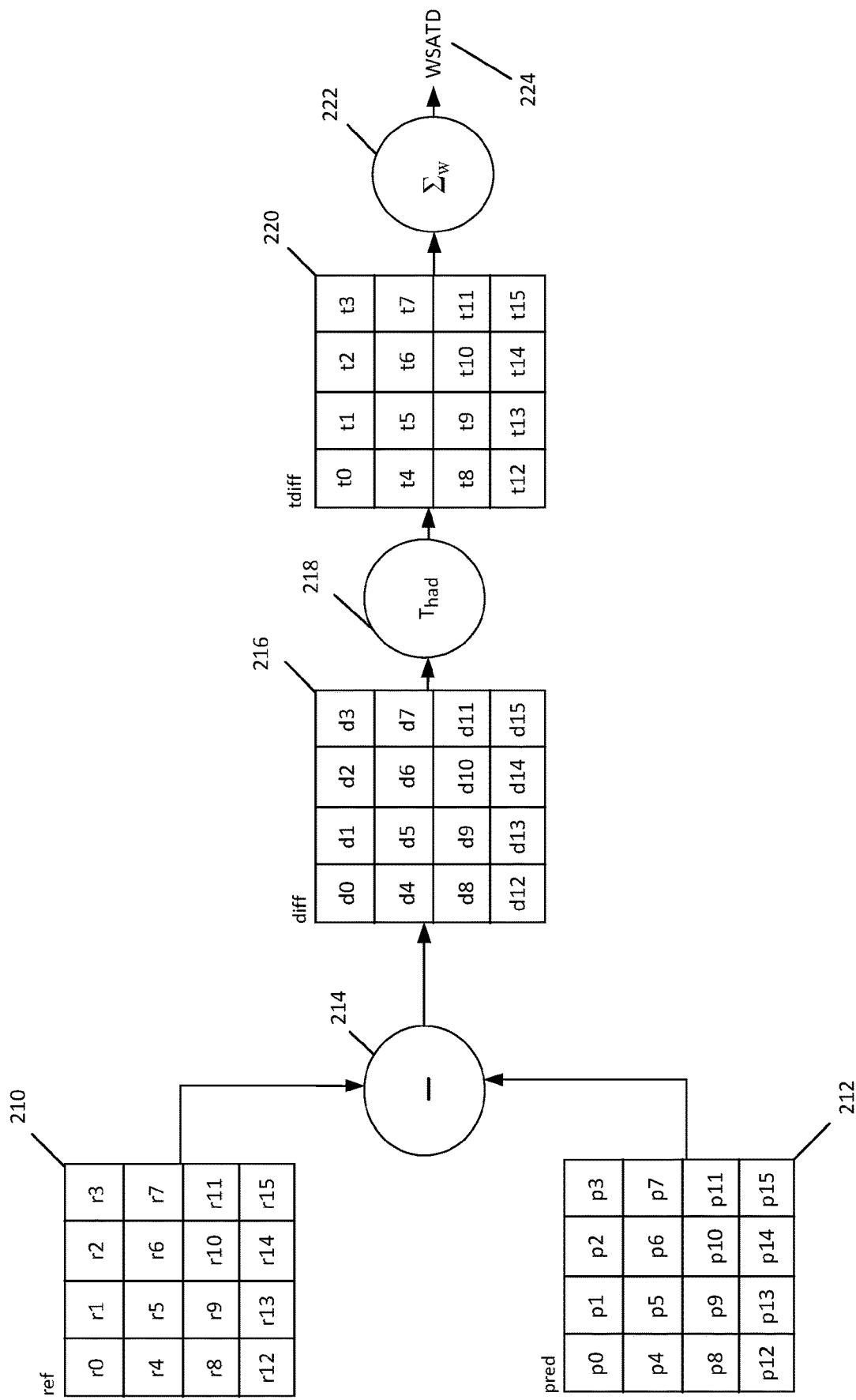
Figure 3:
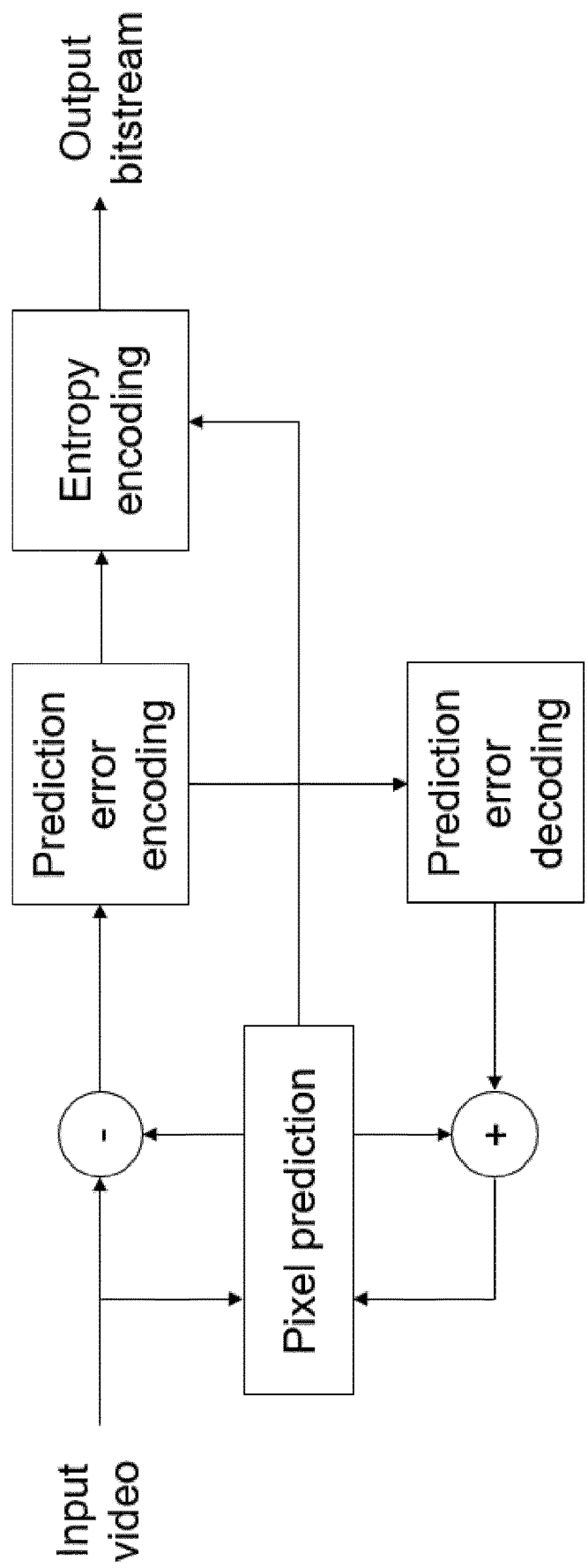
Figure 4:
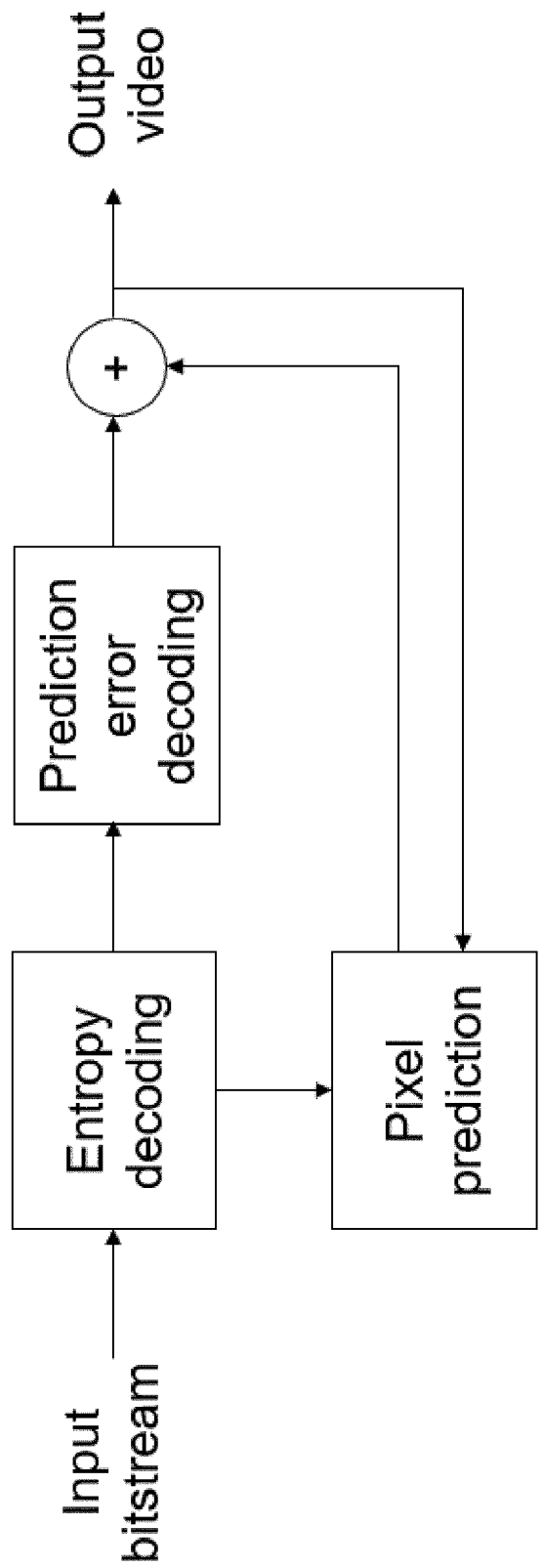

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present disclosure;

FIG. 2A is a flow diagram illustrating operations performed in accordance with an example embodiment;

FIG. 2B is a representation of operations performed in accordance with an example embodiment;

FIG. 3 is a representation of an example encoding process in accordance with an example embodiment; and FIG. 4 is a representation of an example decoding process in accordance with an example embodiment.

DETAILED DESCRIPTION

Some embodiments of the present disclosure will now be described more fully hereinafter with reference to the accompanying drawings, in which some, but not all, embodiments of the invention are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

A video codec may comprise an encoder that transforms an input video into a compressed representation suitable for storage and/or transmission, as well as a decoder that can decode the compressed video representation back into a viewable form. Typically, an encoder discards some information in the original video sequence in order to represent the video in a more compact form (e.g., at a lower bitrate).

An example encoding process is shown in FIG. 3. For example, hybrid video codecs, for example ITU-T H.263 and H.264, encode video information in two phases. In the first phase, pixel values in a certain picture area (e.g., a block) are predicted. This prediction may occur via motion compensation means (e.g., finding and indicating an area in one of the previously coded video frames that corresponds closely to the block being coded) or via spatial means (e.g., using pixel values surrounding the block to be coded in a specified manner). In the second phase, the prediction error (e.g., the difference between the predicted block of pixels and the original block of pixels) is coded. This may be done by transforming the difference in pixel values using a specified transform (e.g., Discrete Cosine Transform (DCT) or similar variant), quantizing the coefficients, and entropy coding the quantized coefficients. By varying the fidelity of the quantization process, an encoder can control the balance between the accuracy of the pixel representation (e.g., picture quality) and size of the resulting coded video representation (e.g., file size or transmission bitrate).

In some video codecs, such as H.265/High Efficiency Video Coding (HEVC), video pictures are divided into coding units (CU) covering the area of the picture. A CU comprises one or more prediction units (PU) which define the prediction process for the samples within the CU as well as one or more transform units (TU) which define the prediction error coding process for the samples within the CU. Said differently, each PU is associated with prediction information defining what kind of a prediction is to be applied for the pixels within that PU (e.g., motion vector information for inter predicted PUs and intra prediction directionality information for intra predicted PUs). Similarly, each TU is associated with information describing the prediction error decoding process for the samples within the respective TU (including, for example, DCT coefficient information).

In some examples, a CU may comprise a square block of samples with a size selectable from a predefined set of possible CU sizes. A CU with the maximum allowed size is typically referred to as a CTU (coding tree unit) and the video picture may be divided into non-overlapping CTUs. A CTU may be further split into a combination of smaller CUs, for example by recursively splitting the CTU and resultant CUs. Each resulting CU may have at least one PU and at least one TU associated with it. Each PU and TU may be further split into smaller PUs and TUs in order to increase granularity of both the prediction and prediction error coding processes, respectively.

Whether prediction error coding is applied or not applied for each CU may typically be signaled at a CU level. In an instance in which there is no prediction error residual associated with the CU, it may be inferred there are no TUs for the said CU. The division of the image into CUs, and division of CUs into PUs and TUs is typically signaled in the bitstream, allowing the decoder to reproduce the intended structure of these units.

An example decoding process is shown in FIG. 4. For example, the decoder may reconstruct the output video by applying prediction means similar to the encoder to form a predicted representation of the pixel blocks (e.g., by using the motion or spatial information created by the encoder and stored in the compressed representation) and prediction error decoding (e.g., the inverse operation of the prediction error coding, recovering the quantized prediction error signal in spatial pixel domain). After applying prediction and prediction error decoding means the decoder may sum the prediction and prediction error signals (e.g., pixel values) to form the output video frame. The decoder (and encoder) may optionally also apply additional filtering means to improve the quality of the output video before providing for display and/or storing it as prediction reference for the forthcoming frames in the video sequence.

Alternative or in addition to approaches utilizing sample value prediction and transform coding for indicating the coded sample values, a color palette-based coding approach may be used. Palette-based coding refers to a family of approaches for which a palette (e.g., a set of colors and associated indexes) is defined and the value for each sample within a CU is expressed by indicating its index in the palette. Palette-based coding may achieve coding efficiency in CUs with a relatively small number of colors, such as areas of an image representing text, simple graphics, or the like. In order to improve the coding efficiency of palette-based coding, different variations of palette index prediction approaches may be utilized, or the palette indexes may be run-length coded to be able to represent larger homogenous image areas more efficiently. Also, in an instance in which the CU contains sample values that are not recurring within the CU, escape coding may be utilized. Escape-coded samples may be transmitted without referring to any of the palette indexes and instead, their values are indicated individually for each escape-coded sample.

In many video codecs, motion information may be indicated with motion vectors associated with each motion compensated image block. Each of these motion vectors represent the displacement of the image block in the picture to be coded (on the encoder side) or decoded (on the decoder side) as well as the prediction source block in one of the previously coded or decoded pictures. In order to represent motion vectors efficiently, they are typically coded differentially with respect to block-specific predicted motion vectors. In typical video codecs, the predicted motion vectors are created in a predefined way, for example by calculating the median of the encoded or decoded motion vectors of the adjacent blocks. As another example, another way to create motion vector predictions is to generate a list of candidate predictions from adjacent blocks and/or co-located blocks in temporal reference pictures and signal the chosen candidate as the motion vector predictor. In addition to predicting the motion vector values, the reference index of previously coded or decoded picture can be predicted as well. The reference index may be predicted from adjacent blocks and/or co-located blocks in a temporal reference picture. Moreover, typical high efficiency video codecs employ an additional motion information coding/decoding mechanism, often called merging or merge mode, wherein all motion field information, which includes motion vector and corresponding reference picture index for each available reference picture list, is predicted and used without any modification or correction. Similarly, predicting the motion field information is carried out using the motion field information of adjacent blocks and/or co-located blocks in temporal reference pictures and the used motion field information is signaled among a list of motion field candidates filled with motion field information of available adjacent/co-located blocks.

Video codecs may support motion compensated prediction from one source image (e.g., uni-prediction) or two sources (e.g., bi-prediction). In uni-prediction, a single motion vector is applied, whereas in bi-prediction, two motion vectors are signaled and the motion compensated predictions from two sources are averaged to create the final sample prediction. In the case of weighted prediction, the relative weights of the two predictions can be adjusted, or a signaled offset can be added to the prediction signal.

In addition to applying motion compensation for inter picture prediction, a similar approach can be applied to intra picture prediction. In this case, the displacement vector indicates from where, in the same picture, a block of samples can be copied to form a prediction of the block to be coded or decoded. This type of intra block copying method may improve coding efficiency substantially with a presence of repeating structures within the frame, such as text or other graphics.

In some examples, the prediction residual after motion compensation or intra prediction is first transformed with a transform kernel (e.g., DCT) and then coded. The reason for this is that often there still exists some correlation among the residual and the transform may help reduce this correlation and provide more efficient coding.

Some example video encoders utilize Lagrangian cost functions to find optimal coding modes, e.g., the desired Macroblock mode and associated motion vectors. This type of cost function uses a weighting factor, k, to tie together the (exact or estimated) image distortion due to lossy coding methods and the (exact or estimated) amount of information that is required to represent the pixel values in an image area:

$$C=D+\lambda R$$

Wherein C represents the Lagrangian cost to be minimized, D represents the image distortion (e.g., Mean Squared Error) with the mode and motion vectors considered, and R represents the number of bits needed to represent the required data to reconstruct the image block in the decoder (including the amount of data to represent the candidate motion vectors).

Scalable video coding refers to a coding structure wherein one bitstream can contain multiple representations of the content at different bitrates, resolutions, and/or frame rates. For example, a receiver may extract the desired representation depending on its characteristics (e.g., a resolution that pairs best with the display device). Alternatively, a server or a network element can extract the portions of the bitstream to be transmitted to the receiver depending on, for example, the network characteristics and/or processing capabilities of the receiver. A scalable bitstream typically consists of a base layer providing the lowest quality video available and one or more enhancement layers that enhance the video quality when received and decoded together with the lower layers. In order to improve coding efficiency for the enhancement layers, the coded representation of that layer typically depends upon the lower layers. In other words, the motion and mode information of the enhancement layer may be predicted from lower layers. Similarly, the pixel data of the lower layers may be used to create prediction for the enhancement layer.

An example scalable video codec for quality scalability (also known as Signal-to-Noise (SNR)) and/or spatial scalability may be implemented as follows: for a base layer, a conventional non-scalable video encoder and decoder may be used. The reconstructed and/or decoded pictures of the base layer may be included in the reference picture buffer for an enhancement layer. For example, in H.264/Advanced Video Coding (AVC), HEVC, and similar codecs using reference picture list(s) for inter prediction, the base layer decoded pictures may be inserted into a reference picture list(s) for coding and/or decoding of an enhancement layer picture similarly to the decoded reference pictures of the enhancement layer. Consequently, the encoder may choose a base-layer reference picture as inter prediction reference and indicate its use with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

In addition to quality scalability, additional scalability modes also exist. Example scalability modes may include spatial scalability (in which base layer pictures are coded at a lower resolution than enhancement lay pictures), bit-depth scalability (in which base layer pictures are coded at lower bit-depth (e.g., 8 bits) than enhancement layer pictures (e.g., 10 or 12 bits)), and chroma format scalability (in which enhancement layer pictures provide higher fidelity in chroma (e.g., coded in 4:4:4 chroma format) than base layer pictures (e.g., 4:2:0 format)). In each of these example scalability modes, base layer information may be used to code the enhancement layer to minimize the additional bitrate overhead.

Scalability may be enabled in two ways, such as by introducing new coding modes for performing prediction of pixel values or syntax from lower layers of the scalable representation, or alternatively, by placing the lower layer pictures to the reference picture buffer (e.g., the decoded picture buffer (DPB)) of the higher layer. The first approach is more flexible and thus may provide better coding efficiency in most instances. However, the second approach (also known as reference frame based scalability) can be implemented very efficiently with minimal changes to single layer codecs while still achieving a majority of the coding efficiency gains available. Essentially, a reference frame based scalability codec can be implemented by utilizing the same hardware or software implementation for all the layers, and handling the DPB management by external means.

In order to be able to utilize parallel processing, images may be split into independently codable and decodable image segments (e.g., slices or tiles). Slices refer to image segments constructed of a certain number of basic coding units that are processed in default coding or decoding order, while tiles refer to image segments that have been defined as rectangular image regions that are processed, at least to some extent, as individual frames.

As described above, mage and video encoders must evaluate a massive number of different modes, options and variables in order to determine a set of parameters that provide a desired representation of the coded material at a target bitrate or a target quality level. This additionally requires minimizing a cost function that includes a measure of reconstruction error and the number of bits needed to code a block of samples with a candidate set of parameters and performing full sample encoding, decoding, and arithmetic encoding of the parameters. This is a significant computational burden and, as described above, practically all encoders perform different approximations of the reconstruction error and bitrate in different encoding stages. In particular, approximating reconstruction error during motion estimation is computationally challenging, as the space of potential motion vectors or motion parameters is typically large, and to reach a satisfactory motion compensation result, a significant number of motion vector candidates need to be analyzed. Similarly, selecting intra prediction modes or pre-selecting those for final analysis stages is challenging due to a large amount of intra prediction mode candidates in modern codecs. Making sub-optimal decisions with simplified cost functions has a negative impact on coding efficiency.

During motion estimation and other parameter searches, conventional video and image encoders approximate the reconstruction error by using prediction error or a derivative of prediction error, wherein the difference between predicted sample values and the original sample values is processed in a predefined way. Alternatives for such error measures may include sum of absolute differences (SAD), sum of squared differences (SSD) and sum of transformed differences (SATD). Similarly, sample averaged versions of these may be used, such as mean absolute error, mean squared error, or mean transformed difference. For example, the early Test Model Long (TML) software (as seen in VCEG document Q15-H-36, "H.26L Test Model Long Term Number 1", Berlin, GE, August, 1999), HM reference software of H.265/HEVC (as seen in ITU-T Recommendation H.265.2, "Reference software for ITU-T H.265 high efficiency video coding", ITU-T, December 2016) and VTM (as seen in JVET document JVET-G1001, "Algorithm description for Versatile Video Coding and Test Model 8 (VTM 8)", Brussels, BE, January 2020) reference encoder of upcoming H.266/Versatile Video Coding (VVC) include such capabilities. These encoder implementations include support for SAD, SSD and SATD based prediction error calculations. The SATD implementation of these encoders are based on a Hadamard transform (HAD). Mathematically, the three alternatives may be formulated as follows:

SAD=sum(abs(diff($x,y$)))

SSD=sum(diff($x,y$)*diff($x,y$))

SATD=sum(abs($t$diff($x,y$)))

Wherein x=[0, blockWidth−1], y=[0, blockHeight−1] for a block of samples with a width of blockWidth and a height of blockHeight. The diff(x, y) is defined as the difference between the predicted sample, pred(x, y), at block position x, y and reference sample, ref(x, y), in the original source sample block in the corresponding position:

diff($x,y$)=ref($x,y$)−pred($x,y$)

Transformed difference tdiff(x, y) can be defined using a 2-dimensional (2D) Hadamard transformation and can thus be given in matrix form using Hadamard transform matrix H:

$t$diff=$H$*diff*$H^T$

Wherein, for example, for a block of 4×4 samples, the H can be selected with a normalization factor of 0.5 as:

$$H = 0.5 \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Alternatively, different variants of transforms may be also used. As an example, the VCEG document Q15-H-36 cited above suggests using:

$$H = 0.5 \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

Different normalization factors may also be used with such transforms and different implementations may implement the normalization differently. For example, normalization parameters of horizontal and vertical transforms can be combined into a single normalization of the output or that can be moved outside of the calculation of the sum in SATD formula. Also, additional normalization factors can be applied in addition to the ones determined by the selected transforms.

An apparatus operating in accordance with an embodiment described herein scales selected coefficients or a single coefficient in the sum of absolute transform difference (SATD) calculation according to determined rules. Advantageously, the resulting direct current (DC) coefficient (representing the mean value of the signal or the coefficient corresponding to the lowest frequency basis function of the applied transform) of the SATD transformation process is scaled down when calculating the value of SATD to improve parameter selection decisions in hybrid video and image codecs, as the effective cost function will minimize difficult-to-code high frequency prediction error more aggressively than it optimizes for the typically easy-to-code DC in terms of the prediction error.

One example of an apparatus 100 that may be configured to carry out operations in accordance with an embodiment described herein is depicted in FIG. 1. As shown in FIG. 1, the apparatus includes, is associated with or is in communication with processing circuitry 12, a memory 14 and a communication interface 16. The processing circuitry 12 may be in communication with the memory via a bus for passing information among components of the apparatus. The memory may be non-transitory and may include, for example, one or more volatile and/or non-volatile memories. In other words, for example, the memory may be an electronic storage device (e.g., a computer readable storage medium) comprising gates configured to store data (e.g., bits) that may be retrievable by a machine (e.g., a computing device like the processing circuitry). The memory may be configured to store information, data, content, applications, instructions, or the like for enabling the apparatus to carry out various functions in accordance with an example embodiment of the present disclosure. For example, the memory could be configured to buffer input data for processing by the processing circuitry. Additionally, or alternatively, the memory could be configured to store instructions for execution by the processing circuitry.

The apparatus 100 may, in some embodiments, be embodied in various computing devices. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally, or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively, or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present disclosure by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally, or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

According to various embodiments, the apparatus 100 may be configured in accordance with an architecture for providing for video encoding, decoding, and/or compression. In this regard, the apparatus 100 may be configured as a video coding device (e.g., an encoder and/or a decoder). For example, the apparatus 100 may be configured to code video in accordance with one or more video compression standards.

FIG. 2A shows an example process 200 including operations of one embodiment. At operation 201, the apparatus 100 includes means, such as the processor 12, memory 14, and/or the like, configured to generate a block of difference samples based on a difference between a first block of samples and a second block of samples. In some embodiments, the first block of samples may be a reference sample block and the second block of samples may be a predicted sample block.

For example, as illustrated in FIG. 2B, an example 4×4 predicted sample block 212 with samples p[i] is deducted from a 4×4 reference sample block 210 with samples r[i], with i ranging from 0 to 15. A difference of the predicted sample block 212 and the reference sample block 210 is calculated (e.g., at 214) and a block of difference samples 216 with samples d[i] is generated.

At operation 202, the apparatus 100 includes means, such as the processor 12, memory 14, and/or the like, configured to generate a block of transform coefficients by applying a transformation process to the block of difference samples. In some embodiments, the transformation process comprises a Hadamard transform. For example, as seen in FIG. 2B, a 2D Hadamard transform may be applied (e.g., at 218) to the block of difference samples 216 and as a result, a transformed difference block 220 comprising transform coefficients t[i] is generated, wherein t0 corresponds to the DC coefficient of the 2D Hadamard transform and i is ranging from 0 to 15.

At operation 203, the apparatus 100 includes means, such as the processor 12, memory 14, and/or the like, configured to determine a representation for one or more transform coefficient in the block of transform coefficients. In some embodiments, the representation may be an absolute value. In some embodiments, the representation may be determined for each transform coefficient in the block of transform coefficients. In this regard, the apparatus 100 includes means, such as the processor 12, memory 14, and/or the like, configured to determine an absolute value for each transform coefficient in the block of transform coefficients.

At operation 204, the apparatus 100 includes means, such as the processor 12, memory 14, and/or the like, configured to determine a weighted sum value for the representations of the transform coefficients within the block of transform coefficients. In some embodiments, a weight of a transform coefficient is based at least on the position of the transform coefficient within the block of transform coefficients.

For example, as seen in FIG. 2B, transform coefficients are provided into a weighted sum operation $\Sigma w$ at 222. The weighted sum operation may calculate the weighted sum of the absolute values of the transform coefficients (WSATD 224) by applying, for example, a quarter (0.25) weight to the DC coefficient t0 and weight of one (1) for the rest as follows:

$$\text{WSATD} = 0.25 * \text{abs}(t_0) + \text{sum}(\text{abs}(t_i)), \quad \text{where } i=1,\ldots,15$$

or $$\text{WSATD} = \text{sum}(w * \text{abs}(t_i)), \text{ where } i=0,\ldots,15; \text{ and}$$
$w=0.25$ when $i$ equals to 0, and $w=1$ otherwise In one embodiment, the DC coefficient or the coefficient corresponding to the lowest frequency basis function of the applied transform is scaled down with respect to the other transform coefficients.

In some embodiments, the absolute value of the DC coefficient is added to the weighted sum with a weight of one quarter (0.25), while absolute values of other coefficients are added to the weighted sum with a weight of one (1). In some embodiments, the absolute value of the DC coefficient is added to the weighted sum with a weight of half (0.50), while absolute values of other coefficients are added to the weighted sum with a weight of one (1).

In some embodiments, the absolute value of the DC coefficient is added to the weighted sum with a weight of zero (0) or omitted from the calculation of the weighted sum, while absolute values of other coefficients are added to the weighted sum with a weight of one (1). In some embodiments, the absolute values of a predetermined set of coefficients are added to the weighted sum with a weight smaller than one (1), while absolute values of other coefficients are added to the weighted sum with a weight of one (1) or larger.

In some embodiments, the absolute values of a predetermined set of coefficients are added to the weighted sum with weights smaller than an average weight, while absolute values of other coefficients are added to the weighted sum with weights larger than or equal to the average weight.

In some embodiments, the weights for different coefficients are determined based on one or more parameters such as, for example, a quantization parameter in residual coding, a lambda parameter used in rate-distortion optimization, a coding mode, a block size, a target bitrate, sample values of the prediction block or original block, and/or other such parameters or parameters derived from those.

The operations of process 200 may be implemented in different ways and some operations may be combined into a single operation fully or at least partially. For example, in some embodiments, calculating the difference between samples of two sample blocks (e.g., blocks 210 and 212) can be included as part of the transformation process (218). In this case, the input to the transform may comprise the two sample blocks and the transform may assign its input as the difference between samples of the input blocks.

Additionally, in some embodiments, the weighted sum of absolute values may be calculated in different ways. For example, the apparatus 100 may first calculate a sum of all the absolute values and modify that sum based on the determined weights. Alternatively, the apparatus 100 may calculate the weighted sum directly by multiplying or bit-shifting the values having weights different from one (1) and adding the values having a weight of one (1).

An example of mean scaled SATD calculations for sample blocks ref(x, y) and pred(x, y), each with a size of 2×2 samples, is now described with reference to Tables A and B below. As seen, for example, in Table A, the DC coefficient c[0] is calculated in the last stage of the transform by adding together the intermediate m[0] and m[1] values, where the sum of m[0]+m[1] represents the sum of all difference samples diff[0], diff[1], diff[2] and diff[3]. An absolute value of the DC coefficient is then divided by 4 or shifted down by 2 bits using bitwise shift down operator, >>, when calculating the weighted sum of the coefficients.

TABLE A diff[0] = ref( 0, 0 ) − pred( 0, 0 )
diff[1] = ref( 1, 0 ) − pred( 1, 0 )
diff[2] = ref( 0, 1 ) − pred( 0, 1 )
diff[3] = ref( 1, 1 ) − pred( 1, 1 )
m[0] = diff[0] + diff[2]
m[1] = diff[1] + diff[3]
m[2] = diff[0] − diff[2]
m[3] = diff[1] − diff[3]
c[0] = m[0] + m[1]
c[1] = m[0] − m[1]
c[2] = m[2] + m[3]

TABLE A-continued c[3] = m[2] − m[3]
satd = 0
satd += abs( c[0] ) >> 2
satd += abs( c[1] )
satd += abs( c[2] )
satd += abs( c[3] )

The same may be also achieved by calculating the DC coefficient without assigning a special variable or register for the DC coefficient, but directly applying the absolute value operation to the sum of m[0] and m[1] that represents the DC coefficient as shown below in Table B.

TABLE B diff[0] = ref( 0, 0 ) − pred( 0, 0 )
diff[1] = ref( 1, 0 ) − pred( 1, 0 )
diff[2] = ref( 0, 1 ) − pred( 0, 1 )
diff[3] = ref( 1, 1 ) − pred( 1, 1 )
m[0] = diff[0] + diff[2]
m[1] = diff[1] + diff[3]
m[2] = diff[0] − diff[2]
m[3] = diff[1] − diff[3]
satd = 0
satd += abs(m[0] + m[1]) >> 2
satd += abs(m[0] − m[1])
satd += abs(m[2] + m[3])
satd += abs(m[2] − m[3])

In some cases, SATD may also be determined as a sum of SATD values of smaller transform blocks. For example, the SATD cost for a 16×16 block size may be approximated by calculating sum of four (4) 8×8 SATD values in four quadrants of the 16×16 block. In such a case, the weighted sum of absolute values of transform coefficients (WSATD) can be calculated either at the subblock level or for the full block.

At operation 205, the apparatus 100 includes means, such as the processor 12, memory 14, and/or the like, configured to apply the weighted sum value as a criterion for a selection decision. For example, weighted SATD calculation may be used in different aspects of video or image encoding or decoding. Weighted SATD calculation may be applied, for example, in motion estimation when evaluating costs for different motion vector or merge candidates, in intra prediction when evaluating costs for different intra prediction candidates, or in coding mode or block segmentation selection when calculating costs for different coding modes or block shapes or sizes. Weighted SATD calculation may also be applied in image or video decoders when performing operations such as decoder-side motion vector refinement, decoder-side motion vector or merge mode selection, or any template matching based operations involving a comparison of two blocks of data with different parameters and determining which parameter minimizes a weighted SATD-based cost function.

As described above, a method, apparatus, and computer program product are disclosed for scaling selected coefficients or a single coefficient in the sum of absolute transform difference (SATD) calculation according to determined rules. Advantageously, the resulting DC coefficient of the SATD transformation process is scaled down when calculating the value of SATD, and certain embodiments described herein improve parameter selection decisions in hybrid video and image codecs, improve coding efficiency, and alleviate the computational burden of conventional codec processes.

FIG. 2 illustrates a flowchart depicting a method according to an example embodiment of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 14 of an apparatus employing an embodiment of the present disclosure and executed by a processor 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising: at least one processor; and at least one memory including computer program code, the at least one memory and the computer program code configured to, with the at least one processor, cause the apparatus at least to:
    generate a block of difference samples based on a difference between a first block of samples and a second block of samples;
    generate a block of transform coefficients by applying a transformation process to the block of difference samples;
    determine a representation for one or more transform coefficients in the block of transform coefficients;
    determine a weighted sum value for the representations of the transform coefficients within the block of transform coefficients, wherein a weight of a transform coefficient is based at least on a position of the transform coefficient within the block of transform coefficients; and
    apply the weighted sum value as a criterion for a selection decision.

2. The apparatus of claim 1, wherein the transformation process comprises a Hadamard transform process.

3. The apparatus of claim 1, wherein the block of transform coefficients comprises a direct current (DC) coefficient, wherein the representation of the DC coefficient is scaled down with respect to the representations of other transform coefficients in the block of transform coefficients.

4. The apparatus of claim 1, wherein the weight of a respective transform coefficient is further based on one or more parameters.

5. The apparatus of claim 4, wherein the one or more parameters comprise one or more of a quantization parameter, a lambda parameter, a coding mode, a block size, a target bitrate, or one or more sample values.

6. The apparatus of claim 1, wherein the first block comprises a reference sample block and the second block comprises a predicted sample block.

7. The apparatus of claim 1, wherein the representation comprises an absolute value.

8. A computer program product comprising a non-transitory computer readable storage medium having program code portions stored thereon, the program code portions configured, upon execution, to:
    generate a block of difference samples based on a difference between a first block of samples and a second block of samples;
    generate a block of transform coefficients by applying a transformation process to the block of difference samples;
    determine a representation for one or more transform coefficients in the block of transform coefficients;
    determine a weighted sum value for the representations of the transform coefficients within the block of transform coefficients, wherein a weight of a transform coefficient is based at least on a position of the transform coefficient within the block of transform coefficients; and
    apply the weighted sum value as a criterion for a selection decision.

9. The computer program product of claim 8, wherein the transformation process comprises a Hadamard transform process.

10. The computer program product of claim 8, wherein the block of transform coefficients comprises a direct current (DC) coefficient, wherein the representation of the DC coefficient is scaled down with respect to the representations of other transform coefficients in the block of transform coefficients.

11. The computer program product of claim 8, wherein the weight of a respective transform coefficient is further based on one or more parameters.

12. The computer program product of claim 11, wherein the one or more parameters comprise one or more of a quantization parameter, a lambda parameter, a coding mode, a block size, a target bitrate, or one or more sample values.

13. The computer program product of claim 8, wherein the first block comprises a reference sample block and the second block comprises a predicted sample block.

14. The computer program product of claim 8, wherein the representation comprises an absolute value.

15. A method comprising:
    generating a block of difference samples based on a difference between a first block of samples and a second block of samples;
    generating a block of transform coefficients by applying a transformation process to the block of difference samples;
    determining a representation for one or more transform coefficients in the block of transform coefficients;
    determining a weighted sum value for the representations of the transform coefficients within the block of transform coefficients, wherein a weight of a transform coefficient is based at least on a position of the transform coefficient within the block of transform coefficients; and
    applying the weighted sum value as a criterion for a selection decision.

16. The method of claim 15, wherein the transformation process comprises a Hadamard transform process.

17. The method of claim 15, wherein the block of transform coefficients comprises a direct current (DC) coefficient, wherein the representation of the DC coefficient is scaled down with respect to the representations of other transform coefficients in the block of transform coefficients.

18. The method of claim 15, wherein the weight of a respective transform coefficient is further based on one or more parameters.

19. The method of claim 18, wherein the one or more parameters comprise one or more of a quantization parameter, a lambda parameter, a coding mode, a block size, a target bitrate, or one or more sample values.

20. The method of claim 15, wherein the first block comprises a reference sample block and the second block comprises a predicted sample block.

* * * * *